(12) United States Patent
Emadi et al.

(10) Patent No.: US 10,576,830 B2
(45) Date of Patent: Mar. 3, 2020

(54) ELECTRIC GENERATOR FOR DIESEL ELECTRIC LOCOMOTIVE

(71) Applicant: Enedym Inc., Hamilton (CA)

(72) Inventors: Ali Emadi, Burlington (CA); Ruoyu Hou, Hamilton (CA); Yinye Yang, Hamilton (CA)

(73) Assignee: Enedym Inc., Hamilton (CA)

( * ) Notice: Subject to any disclaimer, the term of this patent is extended or adjusted under 35 U.S.C. 154(b) by 58 days.

(21) Appl. No.: 15/088,848

(22) Filed: Apr. 1, 2016

(65) Prior Publication Data

US 2017/0021732 A1 Jan. 26, 2017

Related U.S. Application Data

(60) Provisional application No. 62/141,889, filed on Apr. 2, 2015.

(51) Int. Cl.
| | | |
|---|---|---|
| *H02K 7/18* | (2006.01) | |
| *B60L 11/02* | (2006.01) | |
| *H02K 16/02* | (2006.01) | |
| *B60L 15/00* | (2006.01) | |
| *B60L 50/10* | (2019.01) | |
| *H02K 21/12* | (2006.01) | |
| *H02K 19/22* | (2006.01) | |

(52) U.S. Cl.
CPC ............. *B60L 11/02* (2013.01); *B60L 15/002* (2013.01); *B60L 50/10* (2019.02); *H02K 16/02* (2013.01); *B60L 2200/26* (2013.01); *B60L 2220/14* (2013.01); *B60L 2220/18* (2013.01); *B60L 2220/50* (2013.01); *H02K 7/1815* (2013.01); *H02K 19/22* (2013.01); *H02K 21/12* (2013.01); *Y02T 10/641* (2013.01); *Y02T 10/645* (2013.01); *Y02T 10/70* (2013.01)

(58) Field of Classification Search
CPC .......... H02K 5/24; H02K 16/00; H02K 16/02; H02K 17/00; H02K 19/20; H02K 21/16; H02K 37/04; H02K 37/06; H02P 25/08; H02P 25/22; D06F 37/304

See application file for complete search history.

(56) References Cited

U.S. PATENT DOCUMENTS

| | | | | |
|---|---|---|---|---|
| 5,262,693 | A | * 11/1993 | Holka | H02K 7/006 |
| | | | | 310/121 |
| 6,590,312 | B1 | * 7/2003 | Seguchi | B60K 6/26 |
| | | | | 310/114 |
| 7,213,520 | B2 | 5/2007 | Gritsch et al. | |
| 7,256,513 | B2 | 8/2007 | Kumar et al. | |
| 7,652,404 | B2 | 1/2010 | El-Refaie et al. | |
| 8,431,822 | B2 | * 4/2013 | Lee | H01R 9/226 |
| | | | | 174/68.2 |

(Continued)

*Primary Examiner* — Tran N Nguyen
(74) *Attorney, Agent, or Firm* — Bereskin & Parr LLP/S.E.N.C.R.L., S.R.L.

(57) ABSTRACT

Electric generators are described herein. The electric generators include an interior machine formed of an interior rotor and an interior portion of a stator, and an exterior machine substantially concentric to the interior machine. The exterior machine includes: an exterior rotor substantially concentric to the interior rotor, and an exterior portion of the stator. Each of the interior machine and the external machine are driven by an engine to produce a respective current. The described electric generators can be used in diesel electric locomotives.

6 Claims, 7 Drawing Sheets

(56) References Cited

U.S. PATENT DOCUMENTS

| | | |
|---|---|---|
| 8,987,962 B2 | 3/2015 | Kim et al. |
| 9,102,227 B2 | 8/2015 | Yang et al. |
| 2002/0047418 A1* | 4/2002 | Seguchi .................. F02N 11/04 |
| | | 310/114 |
| 2006/0066110 A1* | 3/2006 | Jansen ..................... H02K 1/06 |
| | | 290/44 |
| 2006/0071575 A1* | 4/2006 | Jansen ..................... F03D 9/25 |
| | | 310/266 |
| 2006/0076171 A1* | 4/2006 | Donnelly ................. B60L 7/04 |
| | | 180/65.225 |
| 2008/0053417 A1* | 3/2008 | Eybergen ............... F02B 33/40 |
| | | 123/559.3 |
| 2008/0161189 A1* | 7/2008 | Lewis .................... H02K 16/02 |
| | | 505/121 |
| 2008/0164697 A1* | 7/2008 | Schram et al. .......... F03D 7/02 |
| | | 290/44 |
| 2008/0174194 A1* | 7/2008 | Qu ....................... H02K 7/1823 |
| | | 310/114 |
| 2011/0248589 A1* | 10/2011 | Konecn ................. H02K 16/02 |
| | | 310/114 |
| 2013/0088103 A1* | 4/2013 | Pescarmona ............ H02K 5/20 |
| | | 310/54 |
| 2013/0099504 A1* | 4/2013 | Bagepalli ............... H02K 21/12 |
| | | 290/55 |
| 2013/0181562 A1* | 7/2013 | Gieras ................... H02K 16/02 |
| | | 310/114 |

\* cited by examiner

ELECTRIC GENERATOR FOR DIESEL ELECTRIC LOCOMOTIVE

CROSS-REFERENCE TO RELATED PATENT APPLICATIONS

The application claims the benefit of U.S. Provisional Application No. 62/141,889, filed on Apr. 2, 2015 entitled "Integrated Double-Rotor Electric Generator for Diesel Electric Locomotive". The complete disclosure of U.S. Provisional Application No. 62/141,889 is incorporated herein by reference.

FIELD

The described embodiments relate to an electric generator and specifically, an electric generator for use in diesel electric locomotives.

BACKGROUND

A diesel electric locomotive typically has an engine that operates a shaft to drive other components for powering the locomotive. The other components can include a traction generator and an auxiliary generator.

The auxiliary generator provides power for an auxiliary load(s), and the traction generator provides power for a traction load(s). The traction load is typically associated with a different voltage level than the auxiliary load. For example, the traction generator can operate at a relatively higher voltage in comparison with an operating voltage of the auxiliary generator. As a result, at least two DC-buses may be needed.

When the auxiliary generator is provided as an AC machine, a DC/AC inverter and one of a cycle skipper and an AC/DC rectifier may need to be included. When the traction generator is provided as an AC machine, an AC/DC rectifier and a DC/AC inverter may need to be included. Brushes and slip rings are also needed when the traction generator and the auxiliary generator are provided as AC synchronous machines.

SUMMARY

The various embodiments described herein generally relate to electric generators. Some embodiments are directed to electric generators for use in diesel electric locomotives.

In accordance with an embodiment, there is provided an electric generator including: an interior rotor; an external rotor substantially concentric to the interior rotor; and a stator coupled between the interior rotor and the external rotor, the stator comprising an interior portion coupled to the interior rotor and an exterior portion coupled to the external rotor, each of the interior rotor and the external rotor being driven by an engine to produce a respective current.

In some embodiments, a shaft connects each of the interior rotor and the external rotor to the engine, and the shaft is operated by the engine to drive each of the interior rotor and the external rotor.

In some embodiments, the shaft includes: an exterior shaft for driving the exterior rotor; and an interior shaft for driving the interior rotor, the interior shaft and the exterior shaft are independently controlled.

In some embodiments, the interior rotor and the interior portion of the stator forms an interior machine; and the external rotor and the external portion of the stator forms an exterior machine.

In accordance with an embodiment, there is provided an electric generator including: an interior machine including: an interior rotor; and an interior portion of a stator; and an exterior machine substantially concentric to the interior machine, the exterior machine including: an exterior rotor substantially concentric to the interior rotor; and an exterior portion of the stator; each of the interior machine and the external machine being driven by an engine to produce a respective current.

In some embodiments, a shaft connects each of the interior machine and the external machine to the engine, and the shaft is operated by the engine to drive each of the interior machine and the external machine to produce a respective current.

In some embodiments, the shaft includes: an exterior shaft for driving the exterior machine; and an interior shaft for driving the interior machine, the interior shaft and the exterior shaft are independently controlled.

In some embodiments, each of the interior machine and the exterior machine includes one of a switched reluctance machine, a permanent magnet machine, a surface permanent magnet machine, an induction machine, a permanent magnet synchronous machine, and a synchronous reluctance machine. The interior machine and the exterior machine can include the same type of machine. The interior machine and the exterior machine can include a different type of machine.

In accordance with an embodiment, there is provided a use of the electric generators described herein in a diesel-electric locomotive. The exterior machine can operate as a traction generator for the locomotive and the interior machine can operate as an auxiliary generator for the locomotive.

In accordance with an embodiment, there is provided a diesel-electric locomotive including: an engine; an electric generator connected to the engine via a shaft, the electric generator including: an interior machine including: an interior rotor; and an interior portion of a stator; an exterior machine substantially concentric to the interior machine, the exterior machine including: an exterior rotor substantially concentric to the interior rotor; and an exterior portion of the stator; each of the interior machine and the external machine being driven by the engine to produce a respective current; one or more tractor motors coupled to the exterior machine for receiving power via a first bus bar; and one or more auxiliary motors coupled to the interior machine for receiving power via a second bus bar.

In some embodiments, the shaft includes: an exterior shaft for driving the exterior machine; and an interior shaft for driving the interior machine, the interior shaft and the exterior shaft being independently controlled.

In some embodiments, the engine comprises: a traction engine for driving the exterior machine; and an auxiliary engine for driving the interior machine.

BRIEF DESCRIPTION OF THE DRAWINGS

Several embodiments will now be described in detail with reference to the drawings, in which.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

Figure 1:
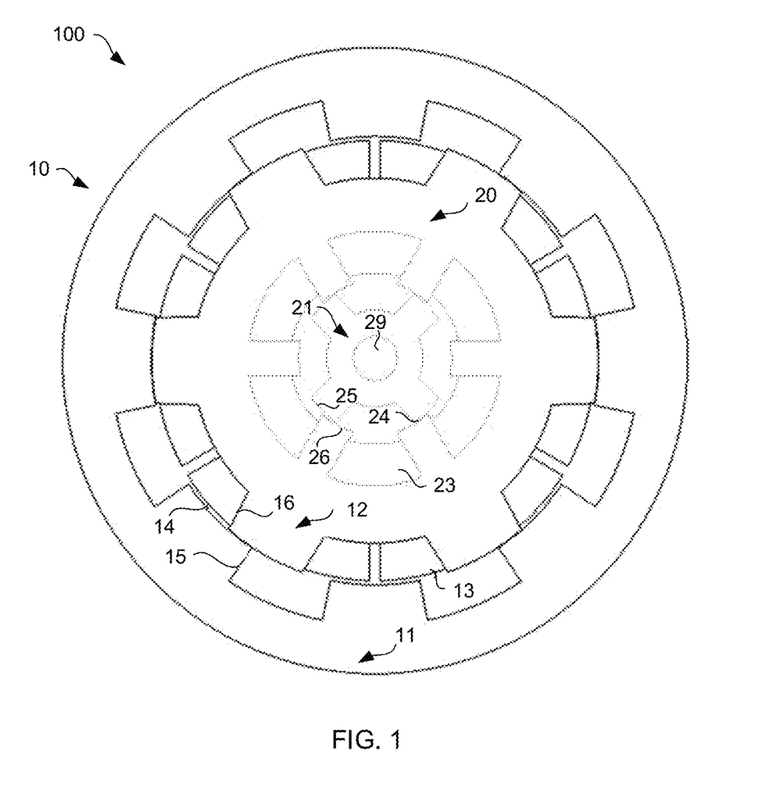
FIG. 1 is a cross-sectional view of an electric generator in accordance with an example embodiment.
Figure 2:
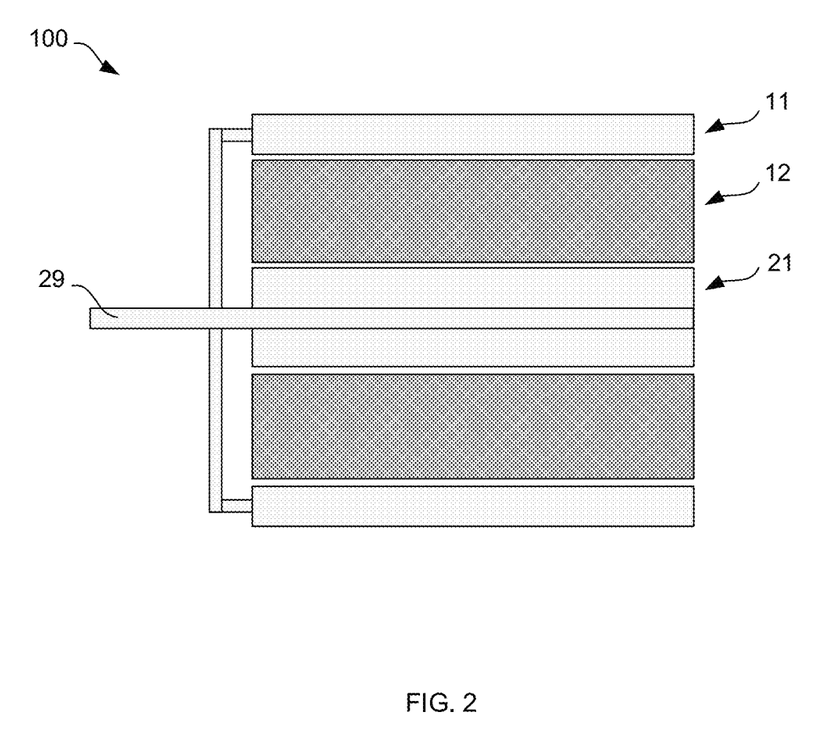
FIG. 2 is a side cross-sectional view of the electric generator of FIG. 1.

FIG. 1 shows a cross-sectional view of an example electric generator 100. FIG. 2 shows a side cross-sectional view of the electric generator 100.

The electric generator 100 includes an exterior rotor 11, an interior rotor 21, and a stator 12. As shown in FIG. 2, the stator 12 is sandwiched between the exterior rotor 11 and the interior rotor 21. The stator 12, therefore, is shared by both the exterior rotor 11 and the interior rotor 21. The coupling between, at least, an exterior portion of the stator 12 and the exterior rotor 11 results in a formation of an exterior machine 10, while the coupling between, at least, an interior portion of the stator 12 and the interior rotor 21 results in a formation of an interior machine 20.

By integrating the exterior rotor 11, the interior rotor 21, and the stator 12 as shown in FIGS. 1 and 2, the electric generator 100 can be more compact in volume and size. In comparison with prior electric generators, the electric generators 100 described herein can be associated with a reduced net manufacturing cost and a higher power density.

The exterior portion and the interior portion of the stator 12 are salient with stator poles 16 and 26, respectively.

The exterior machine 10 can be formed as a switched reluctance machine, an interior permanent magnet machine, a surface permanent magnet machine, an induction machine, permanent magnet synchronous machine, or a synchronous reluctance machine. The example exterior machine 10 shown in FIGS. 1 and 2 is a switched reluctance machine.

The exterior machine 10 includes the exterior rotor 11, an exterior portion of the stator 12, and one or more coil windings 13. As shown in FIG. 1, the exterior rotor 11 is salient with rotor poles 15. An air gap 14 is also formed between the rotor poles 15 and the stator poles 16.

Similar to the exterior machine 10, the interior machine 20 can be formed as a switched reluctance machine, an interior permanent magnet machine, a surface permanent magnet machine, an induction machine, permanent magnet synchronous machine, or a synchronous reluctance machine. The exterior machine 10 and the interior machine 20 can be the same type of machine, or different types of machine, depending on design requirements.

The example interior machine 20 shown in FIGS. 1 and 2 is a switched reluctance machine. The interior machine 20 includes the interior rotor 21, the interior portion of the stator 12, and one or more coil windings 23. The interior rotor 21 is salient with rotor poles 25. An air gap 24 is formed between the rotor poles 25 and the stator poles 26.

As shown in FIG. 1, coil windings 13, 23 are formed on the stator poles 16, 26, respectively, while no coil windings are formed on the rotor 11. The coil windings 13, 23 operate to generate a respective magnetic field.

The number of exterior stator poles 16, exterior rotor poles 15, coil windings 13, interior stator poles 26, interior rotor poles 25, and coil windings 23 shown in FIG. 1 is for illustrative purposes only. Other number of exterior stator poles 16, exterior rotor poles 15, coil windings 13, interior stator poles 26, interior rotor poles 25, and coil windings 23, and pole-pair patterns, may be used.

Figure 3:
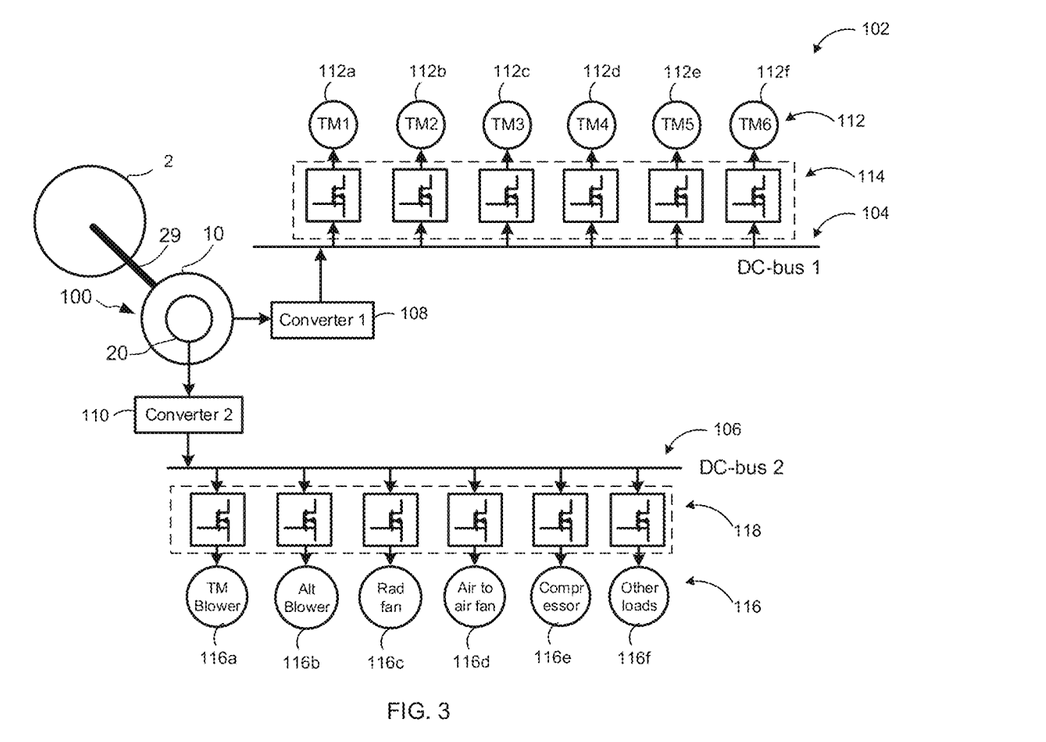
FIG. 3 is a block diagram of components interacting with the electric generator of FIG. 1, in accordance with an example embodiment.

From FIGS. 2 and 3, it can be seen that the exterior rotor 11 and the interior rotor 21 are driven by a shaft 29, which is operated by an engine 2.

FIG. 3 is a block diagram 102 of components interacting with the electric generator 100. As shown in FIG. 3, the electric generator 100 can supply the on-board power for both the traction loads and the auxiliary loads in a diesel electric locomotive.

The exterior machine 10 can operate as a traction generator. As shown in FIG. 3, the exterior machine 10 is driven by the shaft 29 to produce current. The exterior machine 10 provides a DC current onto a bus bar 104 ("DC-bus 1") via a converter component 108 ("Converter 1"). The bus bar 104 can be designed to provide voltage at a level appropriate for the traction motors 112 (such as traction motors 112a to 112f shown in FIG. 3). If any of the traction motors 112 includes AC machines, inverters, such as 114, can be included between the bus bar 104 and the traction motors 112.

The interior machine 20 can operate as an auxiliary generator. As shown in FIG. 3, the interior machine 20 is also driven by the shaft 29 to produce current. The interior machine 20 provides a DC current onto a bus bar 106 ("DC-bus 2") via a converter component 110 ("Converter 2"). The bus bar 106 can be designed to provide voltage at a level appropriate for the auxiliary motors 116 (such as example auxiliary motors 116a to 116f shown in FIG. 3). If any of the auxiliary motors 116 includes AC machines, inverters, such as 118, can be included between the bus bar 106 and the auxiliary motors 116.

Figure 4:
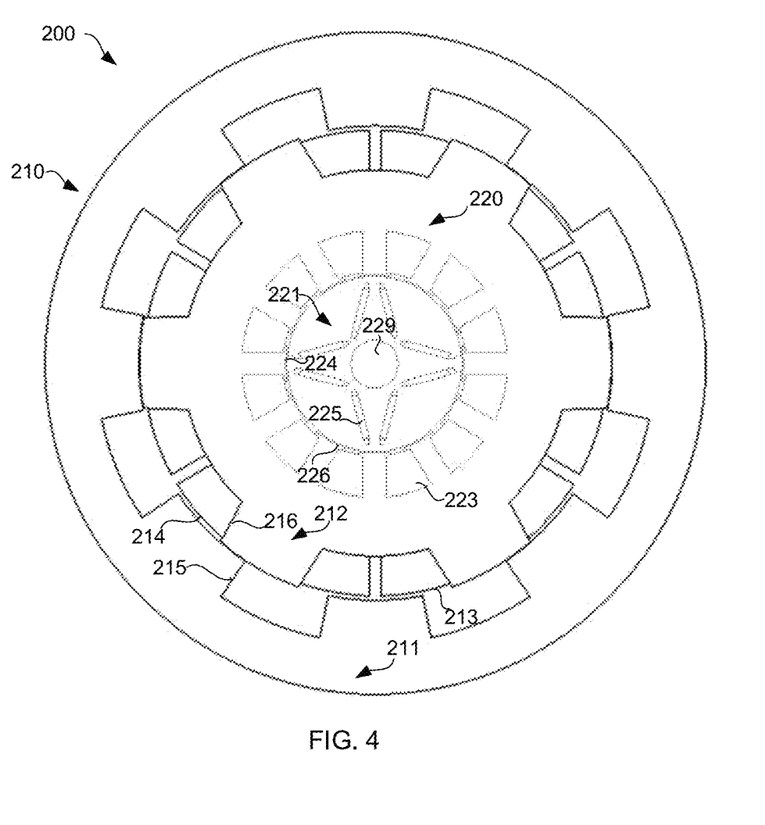
FIG. 4 is a cross-sectional view of an electric generator in accordance with another example embodiment.
Figure 5:
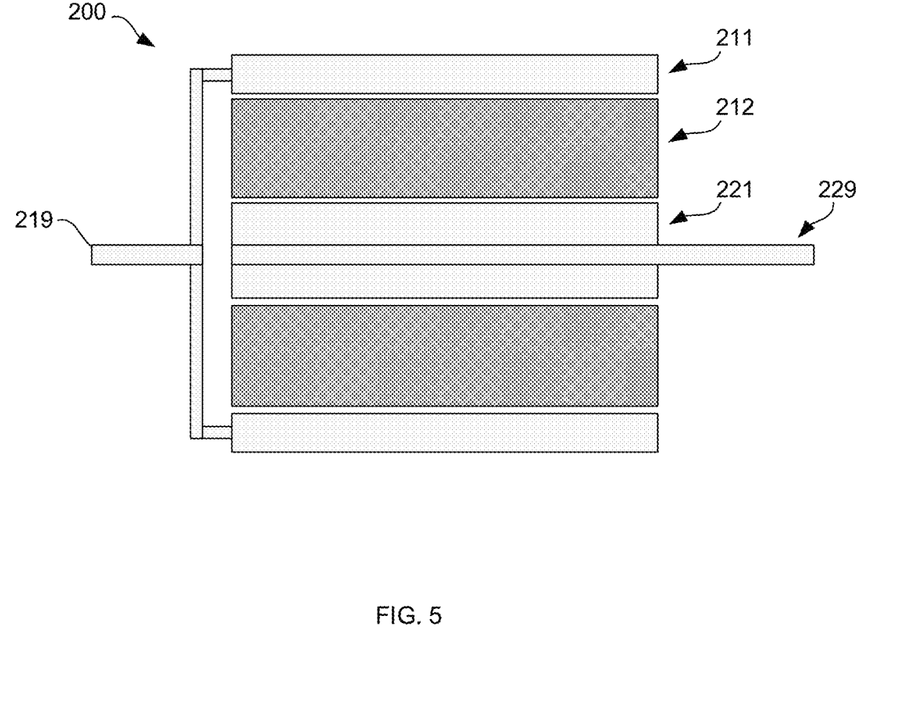
FIG. 5 is a side cross-sectional view of the electric generator of FIG. 4.

FIG. 4 is a cross-sectional view of another example electric generator 200. FIG. 5 is a side cross-sectional view of the electric generator 200.

Similar to the electric generator 100 described with reference to FIGS. 1 and 2, electric generator 200 includes an exterior rotor 211, an interior rotor 221, and a stator 212 sandwiched between the exterior rotor 211 and the interior rotor 221. The stator 212 is shared by the exterior rotor 211 and the interior rotor 221. The coupling between, at least, an exterior portion of the stator 212 and the exterior rotor 211 results in a formation of an exterior machine 210, while the coupling between, at least, an interior portion of the stator 212 and the interior rotor 221 results in a formation of an interior machine 220.

The exterior portion and the interior portion of the stator 212 are salient with stator poles 216 and 226, respectively.

Similar to the exterior machine 10 of FIG. 1, the exterior machine 210 can be formed as a switched reluctance machine, an interior permanent magnet machine, a surface permanent magnet machine, an induction machine, permanent magnet synchronous machine, or a synchronous reluctance machine. The example exterior machine 210 shown in FIGS. 4 and 5 is a switched reluctance machine.

The exterior machine 210 includes the exterior rotor 211, an exterior portion of the stator 212, and one or more coil windings 213. As shown in FIG. 4, the exterior rotor 211 is also salient with rotor poles 215. An air gap 214 is formed between the rotor poles 215 and the stator poles 216.

Similar to the interior machine 20 of FIG. 1, the interior machine 220 can be formed as a switched reluctance machine, an interior permanent magnet machine, a surface permanent magnet machine, an induction machine, permanent magnet synchronous machine, or a synchronous reluctance machine. The example interior machine 220 shown in FIGS. 4 and 5 is a permanent magnet machine.

The interior machine 220 includes the interior rotor 221, the interior portion of the stator 212, and one or more coil windings 223. The interior rotor 221 includes non-salient permanent magnet rotor poles 225. An air gap 224 is formed between the rotor poles 225 and the stator poles 226.

As shown in FIG. 4, coil windings 213, 223 are formed on the stator poles 216, 226, respectively, while no coil windings are formed on the rotor 211. The coil windings 213, 223 operate to generate a respective magnetic field.

The number of the exterior stator poles 216, the exterior rotor poles 215, the coil windings 213, the interior stator poles 226, the interior rotor poles 225, and the coil windings 223 shown in FIG. 4 is for illustrative purposes only. Other number of exterior stator poles 216, exterior rotor poles 215, coil windings 213, interior stator poles 226, interior rotor poles 225, and coil windings 223, and pole-pair patterns, may be used.

From FIG. 5, it can be seen that the exterior rotor 211 is connected to an exterior shaft 219 and the interior rotor 221 is connected to an interior shaft 229. The exterior shaft 219 and interior shaft 229 can be independently driven by different engines, as will be described with reference to FIG. 6. As a result, power generated by the exterior machine 210 and the interior machine 220 can occur in different time manners, as needed. The operation of each of the exterior machine 210 and the interior machine 220 can be controlled at different speed based on the operating conditions.

Figure 6:
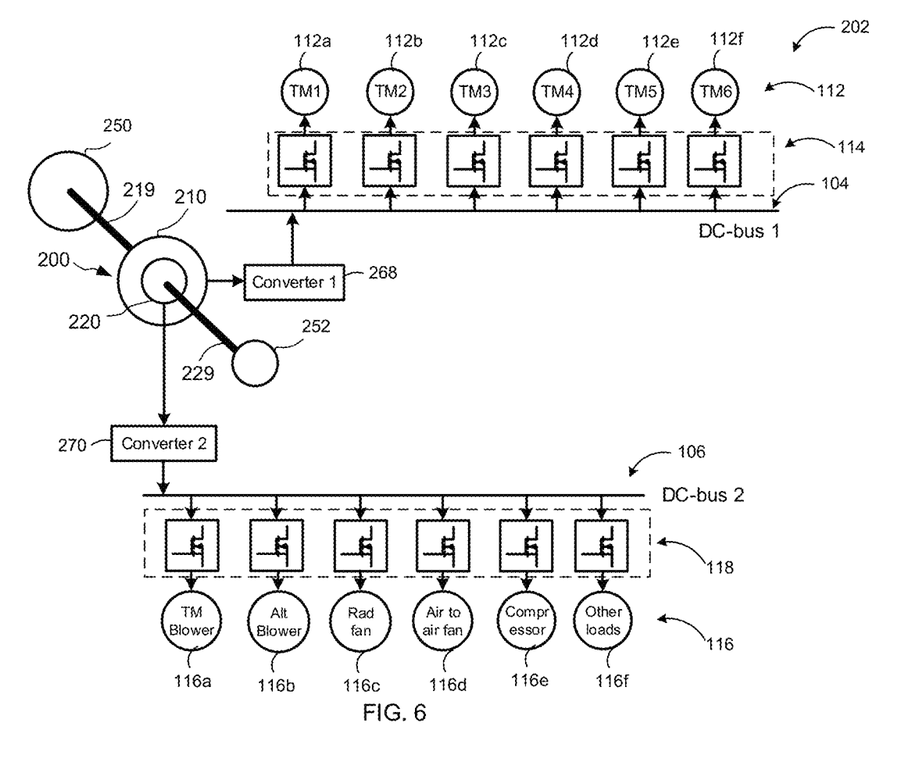
FIG. 6 is a block diagram of components interacting with the electric generator of FIG. 4, in accordance with an example embodiment.

Referring now to FIG. 6, which is a block diagram 202 of components interacting with the electric generator 200.

The exterior machine 210 can operate as the traction generator. As shown in FIG. 6, the exterior machine 210 is driven by a traction engine 250 via the exterior shaft 219 to produce AC current. A converter component 268 ("Converter 1") can receive the AC current from the exterior machine 210 and convert the AC current into DC current for the bus bar 104 ("DC-bus 1"). As described with respect to FIG. 3, the bus bar 104 can be designed to provide voltage at a level appropriate for the traction motors 112 (such as traction motors 112a to 112f shown in FIG. 6). If any of the traction motors 112 includes AC machines, inverters, such as 114, can be included between the bus bar 104 and the traction motors 112.

The interior machine 220 can operate as the auxiliary generator. The interior machine 220 is driven by an auxiliary engine 252 via the interior shaft 229 to produce current. The interior machine 220 provides a DC current onto the bus bar 106 ("DC-bus 2") via a converter component 270 ("Converter 2"). As described with respect to FIG. 3, the bus bar 106 can be designed to provide voltage at a level appropriate for the auxiliary motors 116 (such as example auxiliary motors 116a to 116f shown in FIG. 6). If any of the auxiliary motors 116 includes AC machines, inverters, such as 118, can be included between the bus bar 106 and the auxiliary motors 116.

When the electric generator 200 is used in a locomotive, only the interior machine 220 is excited by the auxiliary engine 252 when the locomotive is operating at the idle notch and so, the traction engine 250 and the exterior machine 210 can be turned off. Fuel efficiency, therefore, can be improved when the locomotive is in the idle mode. A size of the traction engine 250 and the auxiliary engine 252 can also be individually selected based on their respective desired power requirements, rather than the power rating required for the overall locomotive.

Figure 7:
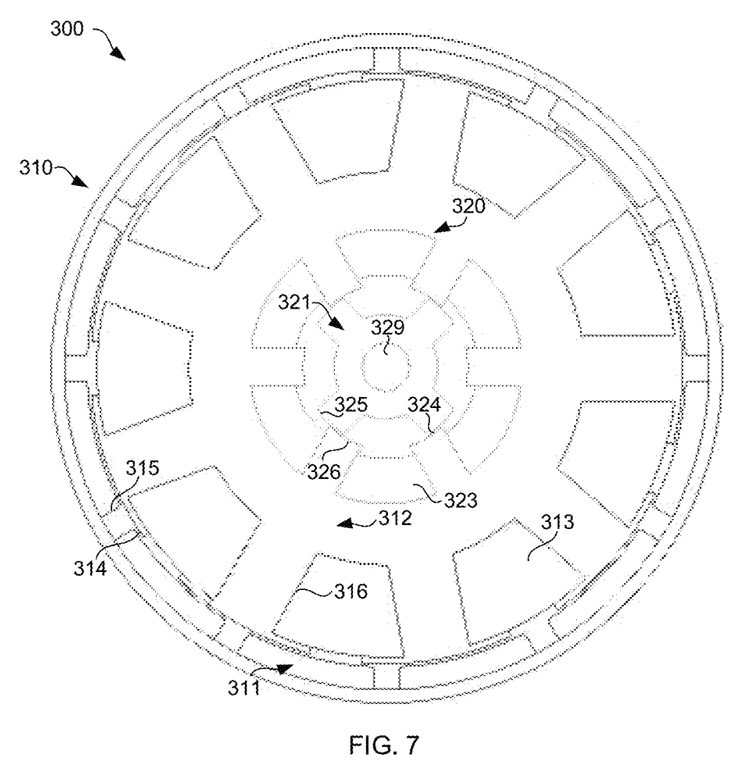
FIG. 7 is a cross-sectional view of an electric generator in accordance with a further example embodiment.

FIG. 7 shows a cross-sectional view of another example electric generator 300.

The electric generator 300 includes an exterior rotor 311, an interior rotor 321, and a stator 312. Similar to the electric generators 100 and 200 described herein, the stator 312 is sandwiched between the exterior rotor 311 and the interior rotor 321. The stator 312, therefore, is shared by both the exterior rotor 311 and the interior rotor 321. The coupling between, at least, an exterior portion of the stator 312 and the exterior rotor 11 results in a formation of an exterior machine 310, while the coupling between, at least, an interior portion of the stator 312 and the interior rotor 321 results in a formation of an interior machine 320.

The exterior portion and the interior portion of the stator 312 are salient with stator poles 316 and 326, respectively.

Similar to the exterior machines 10, 210, the exterior machine 310 can be formed as a switched reluctance machine, an interior permanent magnet machine, a surface permanent magnet machine, an induction machine, permanent magnet synchronous machine, or a synchronous reluctance machine. The example exterior machine 310 shown in FIG. 7 is a permanent magnet synchronous machine.

The exterior machine 310 includes the exterior rotor 311, the exterior portion of the stator 312, and one or more coil windings 313. The exterior rotor 311 includes permanent magnets on the rotor poles 315. An air gap 314 is formed between the rotor poles 315 and the stator poles 316.

Similar to the interior machines 20, 220, the interior machine 320 can be formed as a switched reluctance machine, an interior permanent magnet machine, a surface permanent magnet machine, an induction machine, permanent magnet synchronous machine, or a synchronous reluctance machine. The example interior machine 320 shown in FIG. 7 is a switched reluctance machine.

The interior machine 320 includes the interior rotor 321, the interior portion of the stator 312, and one or more coil windings 323. The interior rotor 321 is salient with rotor poles 325. An air gap 324 is formed between the rotor poles 325 and the stator poles 326.

As shown in FIG. 7, coil windings 313, 323 are formed on the stator poles 316, 326, respectively, while no coil windings are formed on the rotor 311. The coil windings 313, 323 operate to generate a respective magnetic field.

The number of exterior stator poles 316, exterior rotor poles 315, coil windings 313, interior stator poles 326, interior rotor poles 325, and coil windings 323 shown in FIG. 7 is for illustrative purposes only. Other number of exterior stator poles 316, exterior rotor poles 315, coil windings 313, interior stator poles 326, interior rotor poles 325, and coil windings 323, and pole-pair patterns, may be used.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A diesel-electric locomotive comprising:
an engine;
an electric generator connected to the engine via a shaft, the electric generator comprising:
  an interior machine comprising:
    an interior rotor driven by the shaft; and
    an interior portion of a stator;
  an exterior machine substantially concentric to the interior machine, the exterior machine comprising:
    an exterior rotor driven by the shaft and substantially concentric to the interior rotor; and
    an exterior portion of the stator;
  each of the interior machine and the exterior machine being driven by the engine, via the shaft, to produce a respective current;
  the exterior machine being coupled to a first bus bar via a first converter;
  the interior machine being coupled to a second bus bar via a second converter, the second converter being separate from the first converter, the second bus bar being electrically decoupled from the first bus bar, the exterior machine being operable at a higher voltage than the interior machine and the first bus bar being operable to provide a different voltage range than the second bus bar;
one or more traction motors coupled to the exterior machine for receiving power via the first bus bar; and
one or more auxiliary motors coupled to the interior machine for receiving power via the second bus bar.

2. A use of an electric generator in a diesel-electric locomotive, the electric generator comprising:
an interior machine comprising:
  an interior rotor; and
  an interior portion of a stator; and
an exterior machine substantially concentric to the interior machine, the exterior machine comprising:
  an exterior rotor substantially concentric to the interior rotor; and
  an exterior portion of the stator;
each of the interior machine and the exterior machine being driven by an engine, via a common shaft, to produce a respective current;
the exterior machine being coupled to a first bus bar via a first converter;
the interior machine being coupled to a second bus bar via a second converter, the second converter being separate from the first converter, the second bus bar being electrically decoupled from the first bus bar, the exterior machine being operable at a higher voltage than the interior machine and the first bus bar being operable to provide a different voltage range than the second bus bar,
wherein the exterior machine operates to provide power to one or more traction motors of the locomotive via the first bus bar, and
wherein the interior machine operates to supply power to one or more auxiliary loads for the locomotive via the second bus bar.

3. The use of claim 2, wherein the shaft connects each of the interior machine and the exterior machine to the engine, and the shaft is operated by the engine to drive each of the interior machine and the exterior machine to produce a respective current.

4. The use of claim 2, wherein each of the interior machine and the exterior machine comprises one of a switched reluctance machine, a permanent magnet machine, a surface permanent magnet machine, an induction machine, a permanent magnet synchronous machine, and a synchronous reluctance machine.

5. The use of claim 4, wherein each of the interior machine and the exterior machine comprises a same type of machine.

6. The use of claim 4, wherein each of the interior machine and the exterior machine comprises a different type of machine.

* * * * *